United States Patent
Chou et al.

(10) Patent No.: US 9,061,908 B2
(45) Date of Patent: Jun. 23, 2015

(54) HYDROGEN-GENERATING DEVICE

(71) Applicants: Po-Kuei Chou, Hsinchu County (TW);
Yu-Hsiang Lin, Hsinchu County (TW);
Din-Sun Ju, Hsinchu County (TW);
Sin-Yi Gao, Hsinchu County (TW)

(72) Inventors: Po-Kuei Chou, Hsinchu County (TW);
Chien-Hsun Yang, New Taipei (TW);
Yu-Hsiang Lin, Hsinchu County (TW);
Din-Sun Ju, Hsinchu County (TW);
Sin-Yi Gao, Hsinchu County (TW)

(73) Assignee: YOUNG GREEN ENERGY CO., Hsinchu County (TW)

( * ) Notice: Subject to any disclaimer, the term of this patent is extended or adjusted under 35 U.S.C. 154(b) by 466 days.

(21) Appl. No.: 13/666,992

(22) Filed: Nov. 2, 2012

(65) Prior Publication Data
US 2013/0115142 A1     May 9, 2013

(30) Foreign Application Priority Data
Nov. 3, 2011   (CN) .......................... 2011 1 0348352

(51) Int. Cl.
*C01B 3/06* (2006.01)
*C01B 6/00* (2006.01)
*B01J 7/02* (2006.01)

(52) U.S. Cl.
CPC . *C01B 3/065* (2013.01); *B01J 7/02* (2013.01); *Y02E 60/362* (2013.01)

(58) Field of Classification Search
CPC ..................................... C01B 3/08; B01J 7/02
See application file for complete search history.

(56) References Cited

U.S. PATENT DOCUMENTS

| 7,556,660 | B2 * | 7/2009 | Shurtleff et al. ................... 48/61 |
| 7,648,786 | B2 * | 1/2010 | Shurtleff et al. ............. 429/421 |
| 7,651,542 | B2 * | 1/2010 | Shurtleff et al. ................... 48/61 |
| 2001/0045364 | A1 * | 11/2001 | Hockaday et al. ............ 205/338 |

(Continued)

FOREIGN PATENT DOCUMENTS

| CN | 101049907 | 10/2007 |
| JP | 63-007620 | 1/1988 |

(Continued)

OTHER PUBLICATIONS

"Office Action of Japan Counterpart Application", issued on Nov. 26, 2013, p. 1-p. 3.

(Continued)

*Primary Examiner* — Matthew Merkling
(74) *Attorney, Agent, or Firm* — Jianq Chyun IP Office

(57) ABSTRACT

A hydrogen-generating device is provided, which includes a reaction tank, a first cap, a second cap and a first guiding-pipe. The reaction tank has an accommodation space for accommodating a solid reactant. The first cap covers the accommodation space, wherein the first cap has a plurality of first open-holes. The second cap is disposed on the first cap and has a second open-hole, wherein the first cap and the second cap form a chamber therebetween. The first guiding-pipe passes through the first cap and the second cap to extend to the accommodation space, wherein the first open-holes surround the first guiding-pipe. A liquid reactant is for passing through the first guiding-pipe to arrive in the accommodation space and reacts with the solid reactant to generate a hydrogen. The hydrogen passes through the first open-holes to arrive at the chamber and then is expelled from the second open-hole.

16 Claims, 5 Drawing Sheets

(56) References Cited

U.S. PATENT DOCUMENTS

| | | |
|---|---|---|
| 2007/0243431 A1 | 10/2007 | Zhu et al. |
| 2009/0078568 A1* | 3/2009 | Ramaswami et al. ........ 204/266 |
| 2011/0194992 A1* | 8/2011 | Barton et al. ................. 422/239 |

FOREIGN PATENT DOCUMENTS

| | | |
|---|---|---|
| JP | 2006-096581 | 4/2006 |
| JP | 2006-107918 | 4/2006 |
| JP | 4551171 | 9/2010 |
| TW | 200642156 | 12/2006 |
| TW | 200904747 | 2/2009 |
| WO | 2007098109 | 8/2007 |

OTHER PUBLICATIONS

"Office Action of China Counterpart Application", issued on Apr. 30, 2014, p. 1-p. 7.

* cited by examiner

HYDROGEN-GENERATING DEVICE

CROSS-REFERENCE TO RELATED APPLICATION

This application claims the priority benefit of China application serial no. 201110348352.2, filed on Nov. 3, 2011. The entirety of the above-mentioned patent application is hereby incorporated by reference herein and made a part of this specification.

BACKGROUND OF THE INVENTION

1. Field of the Invention

The invention generally relates to a gas-generating device, and more particularly, to a hydrogen-generating device.

2. Description of Related Art

A fuel cell (FC) is a power generation device capable of directly converting chemical energy into electricity. Taking a proton exchange membrane FC as an example, an operation principle thereof is as follows. Hydrogen is oxidized in an anode catalyst layer to generate hydrogen ions ($H^+$) and electrons ($e^-$), or methanol and water are oxidized in the anode catalyst layer to generate hydrogen ions ($H^+$), carbon dioxide ($CO_2$), and electrons ($e^-$), wherein the hydrogen ions could be transmitted to a cathode through a proton exchange membrane, and the electrodes are transmitted to a load through an external circuit, and then are transmitted to the cathode. At the meantime, oxygen supplied to the cathode and the hydrogen ions and the electrodes may carry out a reduction reaction in a cathode catalyst layer to generate water. The fuel hydrogen gas for the anode hydrogen oxidation reaction may be obtained through a solid sodium borohydride ($NaBH_4$) hydrogen storage technology which relies on the reaction of water and the solid sodium borohydride to produce the hydrogen gas.

In more details, the solid sodium borohydride could be placed in a reaction tank and water is guided into the tank to react with the solid sodium borohydride to generate hydrogen. In order to increase the reaction speed of the water and the solid sodium borohydride, the water is guided into the reaction tank from multiple locations through a specific channel design and it is referred as water-feeding at multiple points. However, such scheme requires a too-complicated channel and the entire structure volume is increased. In addition, a water pump with a larger static-pressure is required to pump water into a fuel tank. In particular, when the water reacts with the solid sodium borohydride in the reaction tank to generate hydrogen, the hydrogen will find relief towards the low-pressure locations of the reaction tank so that it is unable to drive the water to arrive at all the portions of the solid sodium borohydride through the flowing of the hydrogen, which makes partial solid sodium borohydride unable to react with the water to reduce the hydrogen-generating efficiency.

U.S. Patent Application Publication No. 20070243431 discloses a fuel cartridge containing a solid fuel for generating hydrogen and a catalyst, wherein the liquid reactants enters from the entrance of the fuel cartridge to react with the solid fuel to generate hydrogen, and the hydrogen is expelled from a side outlet of the fuel cartridge. Taiwan Patent Application Publication No. 200642156 discloses a cartridge, which includes a reservoir and a reaction chamber. When the cartridge connects the receiver, a first reactant in the reservoir could be sent to the reaction chamber, while a second reactant in the reaction chamber would react with the first reactant. Taiwan Patent Application Publication No. 200904747 discloses a hydrogen machine, wherein a reaction chamber has a filling port and a discharge port, the user could fill the reaction solution and the metal material into the reaction chamber for reaction via the filling port. The hydrogen generated in the reaction chamber is output from a hydrogen output pipe to the corresponding device for use.

SUMMARY OF THE INVENTION

Accordingly, the invention is directed to a hydrogen-generating device with better hydrogen-generating efficiency.

Other objectives and advantages of the invention should be further indicated by the disclosures of the invention, and omitted herein for simplicity.

To achieve one of, a part of or all of the above-mentioned advantages, or to achieve other advantages, an embodiment of the invention provides a hydrogen-generating device, which includes a reaction tank, a first cap, a second cap and a first guiding-pipe. The reaction tank has an accommodation space for accommodating a solid reactant. The first cap covers the accommodation space, wherein the first cap has a plurality of first open-holes. The second cap is disposed on the first cap and has a second open-hole, wherein the first cap and the second cap form a chamber therebetween. The first guiding-pipe passes through the first cap and the second cap to extend to the accommodation space, wherein the first open-holes surround the first guiding-pipe. A liquid reactant is capable of passing through the first guiding-pipe to arrive in the accommodation space and reacts with the solid reactant to generate a hydrogen. The hydrogen passes through the first open-holes to arrive at the chamber and is expelled from the second open-hole.

Based on the description above, in the above-mentioned embodiment of the invention, since the first guiding-pipe is surrounded by the first open-holes of the first cap, the hydrogen generated by the reaction between the liquid reactant and the solid reactant would flow from the place where the guiding-pipe is located to the first open-holes, which guides the liquid reactant to all the portions of the solid reactant so that the reaction of the solid reactant is more complete to advance the hydrogen-generating efficiency.

Other objectives, features and advantages of the invention will be further understood from the further technological features disclosed by the embodiments of the present invention wherein there are shown and described preferred embodiments of this invention, simply by way of illustration of modes best suited to carry out the invention.

DESCRIPTION OF THE EMBODIMENTS

In the following detailed description of the preferred embodiments, reference is made to the accompanying drawings which form a part hereof, and in which are shown by way of illustration specific embodiments in which the invention may be practiced. In this regard, directional terminology, such as "top," "bottom," "front," "back," etc., is used with reference to the orientation of the Figure(s) being described. The components of the present invention can be positioned in a number of different orientations. As such, the directional terminology is used for purposes of illustration and is in no way limiting. On the other hand, the drawings are only schematic and the sizes of components may be exaggerated for clarity. It is to be understood that other embodiments may be utilized and structural changes may be made without departing from the scope of the present invention. Also, it is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted" and variations thereof herein are used broadly and encompass direct and indirect connections, couplings, and mountings.

Similarly, the terms "facing," "faces" and variations thereof herein are used broadly and encompass direct and indirect facing, and "adjacent to" and variations thereof herein are used broadly and encompass directly and indirectly "adjacent to". Therefore, the description of "A" component facing "B" component herein may contain the situations that "A" component directly faces "B" component or one or more additional components are between "A" component and "B" component. Also, the description of "A" component "adjacent to" "B" component herein may contain the situations that "A" component is directly "adjacent to" "B" component or one or more additional components are between "A" component and "B" component. Accordingly, the drawings and descriptions will be regarded as illustrative in nature and not as restrictive.

Figure 1:
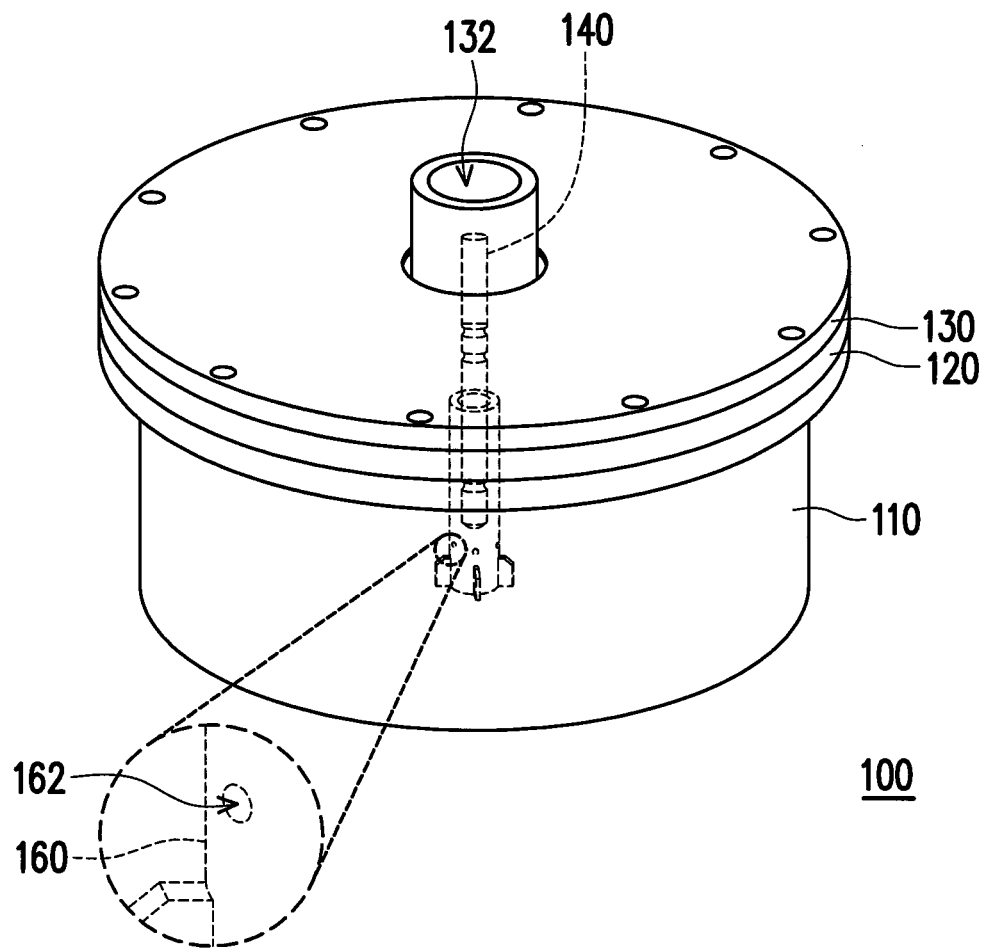
FIG. 1 is a schematic three-dimensional diagram of a hydrogen-generating device according to an embodiment of the invention.
Figure 2:
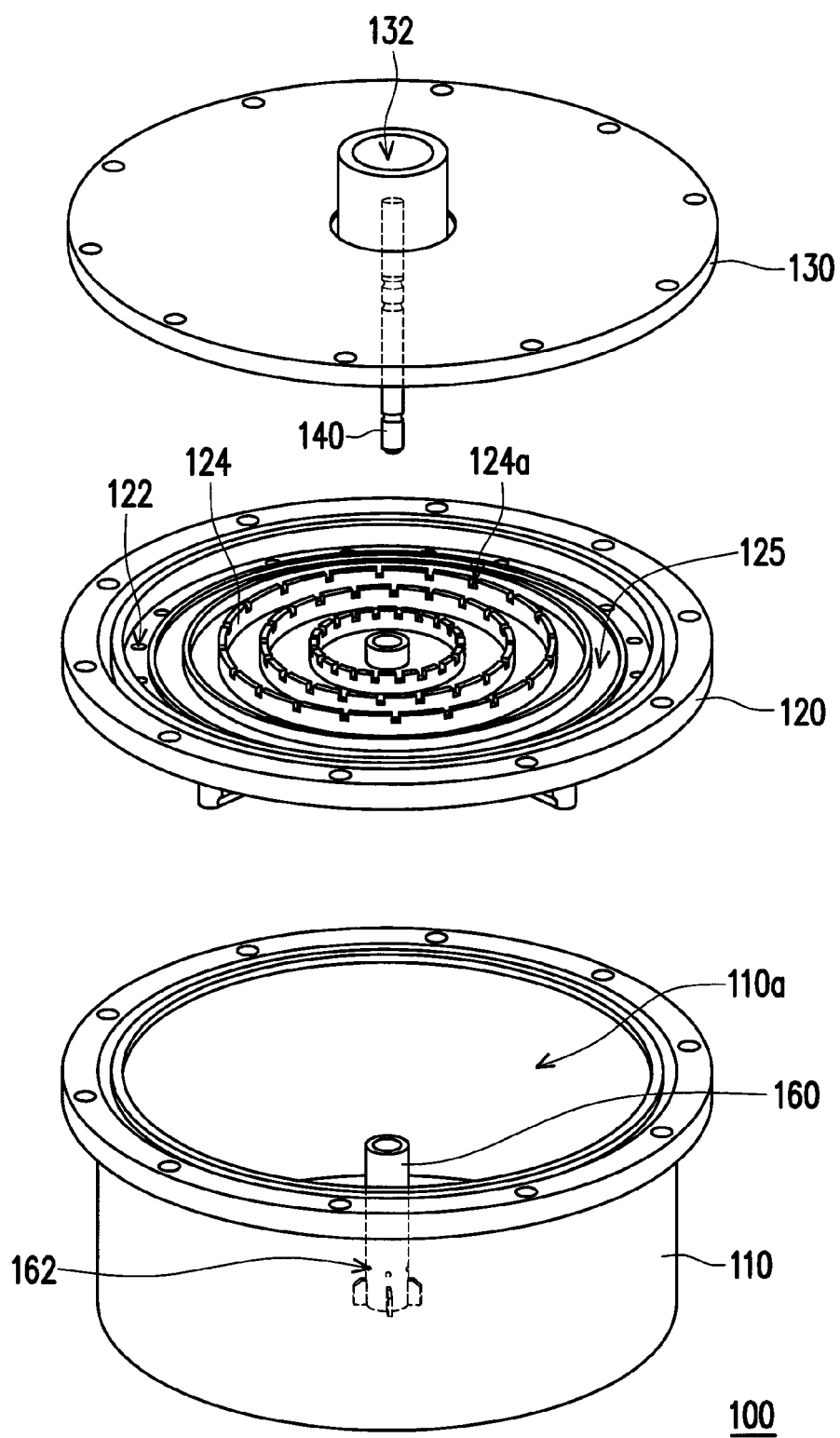
FIG. 2 is an exploded diagram of the hydrogen-generating device of FIG. 1.
Figure 3:
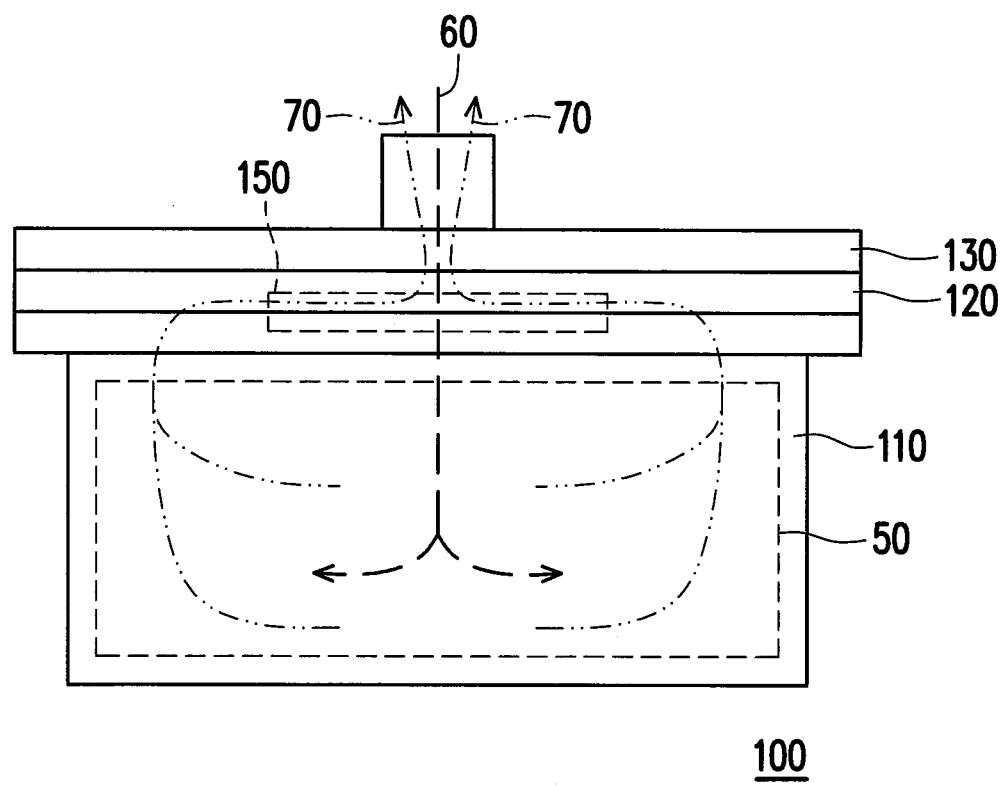
FIG. 3 is a diagram showing a hydrogen-generating process of the hydrogen-generating device of FIG. 1.

FIG. 1 is a schematic three-dimensional diagram of a hydrogen-generating device according to an embodiment of the invention. FIG. 2 is an exploded diagram of the hydrogen-generating device of FIG. 1., FIG. 3 is a diagram showing a hydrogen-generating process of the hydrogen-generating device of FIG. 1. Referring to FIGS. 1-3, a hydrogen-generating device 100 of the embodiment includes a reaction tank 110, a first cap 120, a second cap 130, and a first guiding-pipe 140. The reaction tank 110 has an accommodation space 110a, the first cap 120 covers the accommodation space 110a and the accommodation space 110a is for accommodating a solid reactant 50 which is, for example, solid sodium borohydride ($NaBH_4$). The second cap 130 is disposed on the first cap 120 by fastening (in FIG. 1, at the external circle, multiple small-spots surrounding the second cap 130 are the fastening points), locking, thermally-laminating, gluing or other ways, and the first cap 120 and the second cap 130 form a chamber 125 therebetween.

The first guiding-pipe 140 passes through the first cap 120 and the second cap 130 and extends to the accommodation space 110a. The first cap 120 has a plurality of first open-holes 122 surrounding the first guiding-pipe 140, and the second cap 130 has a second open-hole 132. The first guiding-pipe 140 is for guiding a liquid reactant 60 to the accommodation space 110a where the liquid reactant 60 reacts with the solid reactant 50 to generate hydrogen 70. The liquid reactant 60 is, for example, liquid water. The hydrogen 70 could pass through the first open-holes 122 to arrive at the chamber 125 and then is expelled from the second open-hole 132.

Under the above-mentioned layout, since the first guiding-pipe 140 is surrounded by the first open-holes 122 of the first cap 120, the hydrogen 70 generated by the reaction between the liquid reactant 60 and the solid reactant 50 would flow from the place where the guiding-pipe 140 is located to the first open-holes 122, which guides the liquid reactant 60 to all the portions of the solid reactant 50 so that the reaction of the solid reactant 50 is more complete to enhance the hydrogen-generating efficiency. In addition, during the hydrogen-generating process by the reaction between the liquid reactant 60 and the solid reactant 50, other products of reaction (such as sodium metaborate tetrahydrate $NaBO_2 \cdot 4H_2O$) may also be generated and obstruct the flowing of the subsequent liquid reactant 60. At the time, the hydrogen 70 flowing towards the first open-holes 122 functions to break out the hindering of the above-mentioned products and guides the liquid reactant 60 to all the portions of the solid reactant 50.

Referring to FIG. 2, the first cap 120 of the embodiment has a plurality of baffles 124 extending to the chamber 125, the baffles 124 are a plurality of concentric-circle structures surrounding the second open-hole 132, and the first open-holes 122 surround the baffles 124. When the liquid reactant 60 arrives in the accommodation space 110a to react with the solid reactant 50, not only the generated hydrogen 70 but also the moisture in the accommodation space 110a would pass through the first open-holes 122 to arrive at the chamber 125. The baffles 124 functions to make the moisture be condensed thereon, so that partial moisture is converted into water drops to relieve the pressure and avoid the excessive pressure in the chamber 125. In addition, each of the baffles 124 has a plurality of notches 124a, and the hydrogen 70 could cross each of the baffles 124 to arrive at the second open-hole 132 through the notches 124a. The hydrogen-generating device 100 further includes a filter component 150, as shown by FIG. 3. The filter component 150 is disposed in the chamber 125 and the hydrogen 70 passes through the filter component 150 to arrive at the second open-hole 132 (referring to FIGS. 1 and 2) to filter the impurity.

In the embodiment, the hydrogen-generating device 100 further includes a hollow pipe 160 fixed in the reaction tank 110 and located in the accommodation space 110a. The wall of the hollow pipe 160 has a plurality of holes 162 and the holes 162 respectively face different areas of the accommodation space 110a. The first guiding-pipe 140 extends to the hollow pipe 160 so that the liquid reactant 60 could pass through the holes 162 to arrive at all the areas in the accommodation space 110a uniformly.

As shown in FIGS. 1 and 2, the first guiding-pipe 140 of the embodiment passes through the second cap 130 via the second open-hole 132. However, the embodiment does not limit the design for the first guiding-pipe 140 to pass through the second cap 130, and more examples are explained in association with figures in following.

Figure 4:
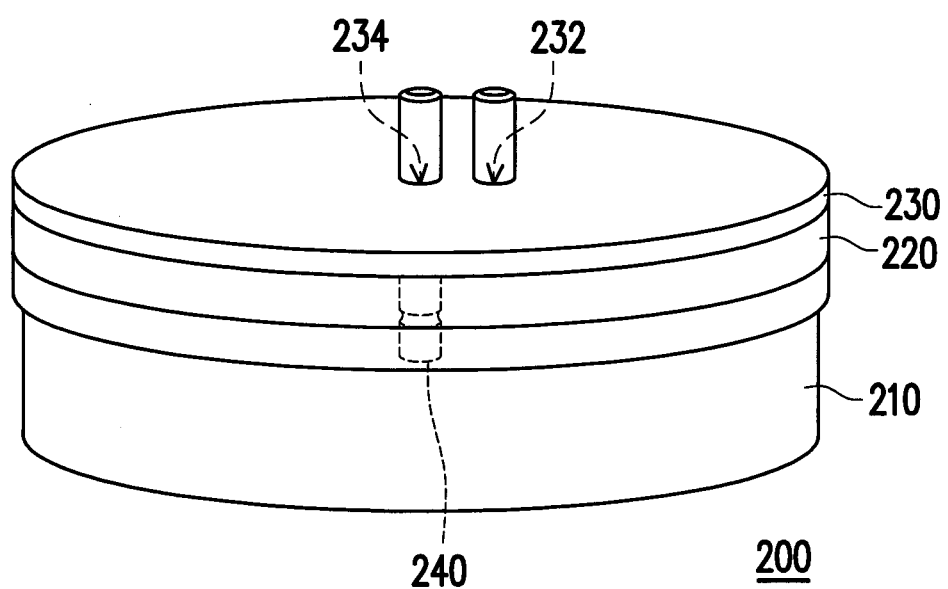
FIG. 4 is a schematic three-dimensional diagram of a hydrogen-generating device according to another embodiment of the invention.

FIG. 4 is a schematic three-dimensional diagram of a hydrogen-generating device according to another embodiment of the invention. Referring to FIG. 4, a hydrogen-generating device 200 includes a reaction tank 210, a first cap 220, a second cap 230 and a first guiding-pipe 240. The assembling way of the reaction tank 210, the first cap 220, and the second cap 230 and the hydrogen-generating way by the reaction between the liquid reactant and the solid reactant are similar to that of the hydrogen-generating device 100, which is omitted to describe. In the previous embodiment, the first guiding-pipe 140 of the hydrogen-generating device 100 passes through the second cap 130 via the second open-hole 132 for expelling the hydrogen. By comparison, in the embodiment, the first guiding-pipe 240 passes through the second cap 230 via a third open-hole 234 additionally employed and disposed at the second cap 230 for expelling the hydrogen rather than the second open-hole 232. In this way, the first guiding-pipe 240 passes through the second cap 230 and then passes through the first cap 220 to arrive in the reaction tank 210. With the design, the first guiding-pipe 240 does not occupy the area of the second open-hole 232 so that the second open-hole 232 provides a bigger effective aperture. In addition, the first guiding-pipe 240 and the second open-hole 232 could be respectively connected to different devices (for example, the water tank as shown in following description) without interference.

Figure 5:
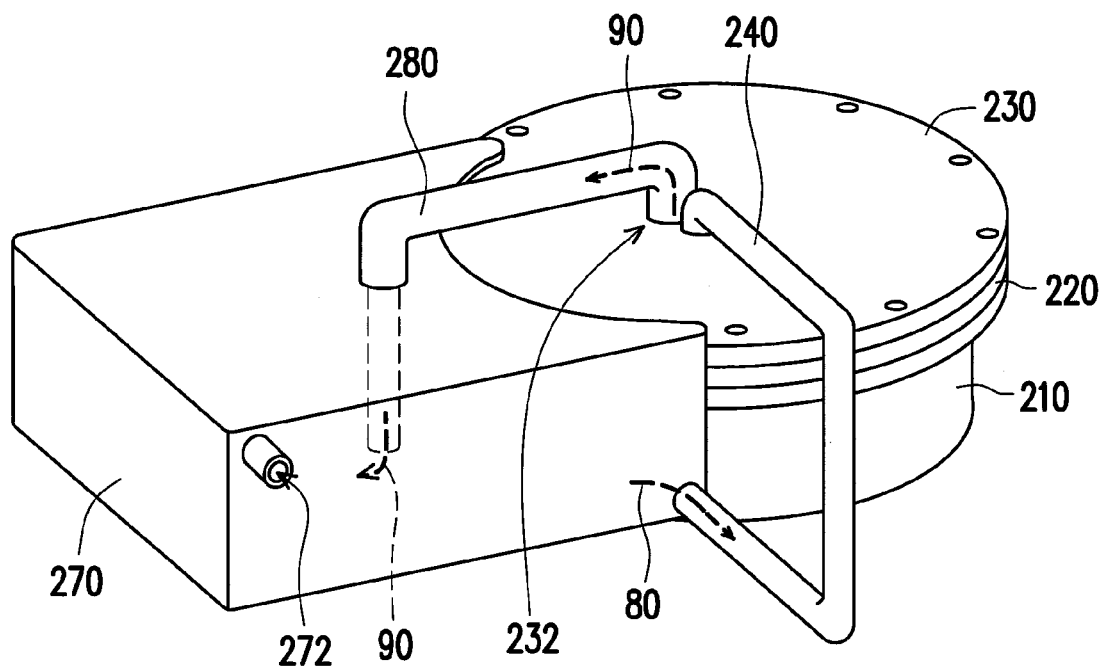
FIG. 5 is a schematic three-dimensional diagram showing the reaction tank of FIG. 4 and a water tank connected by the reaction tank.

FIG. 5 is a schematic three-dimensional diagram showing the reaction tank of FIG. 4 and a water tank connected by the reaction tank. Referring to FIG. 5, a hydrogen-generating device 200 of the embodiment further includes a water tank 270 and a second guiding-pipe 280. The water tank 270 has an exhaust 272 and accommodates a liquid reactant 80 such as water. The first guiding-pipe 240 is communicated with the water tank 270 and the second guiding-pipe 280 is communicated with the second open-hole 232 and extends to the water tank 270. The liquid reactant 80 is guided through the first guiding-pipe 240 from the water tank 270 to the reaction tank 210 where the liquid reactant 80 reacts with the solid reactant in the reaction tank 210 to generate hydrogen.

The hydrogen generated at the reaction tank 210 is guided to the water tank 270 through the second guiding-pipe 280, while the hydrogen 90 in the water tank 270 is guided to a fuel cell stack for use. During the process of generating the hydrogen 90, heat is produced as well. However, the liquid reactant 80 in the water tank 270 could cool the hydrogen 90 down, which avoids an excessive temperature of the hydrogen 90 to damage the fuel cell stack. In addition, the liquid reactant 80 could absorb the handful impurity (such as ammonia generated by the hydrogen-generating reaction) in the hydrogen 90. Moreover, the moisture in the reaction tank 210 could be guided to the water tank 270 through the second guiding-pipe 280 so that the moisture is solved in the liquid reactant 80 for recycle usage.

Figure 6:
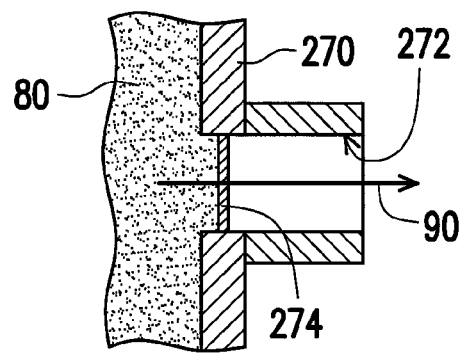
FIG. 6 is a partial cross-sectional diagram of the exhaust structure of the water tank of FIG. 5.
Figure 7:
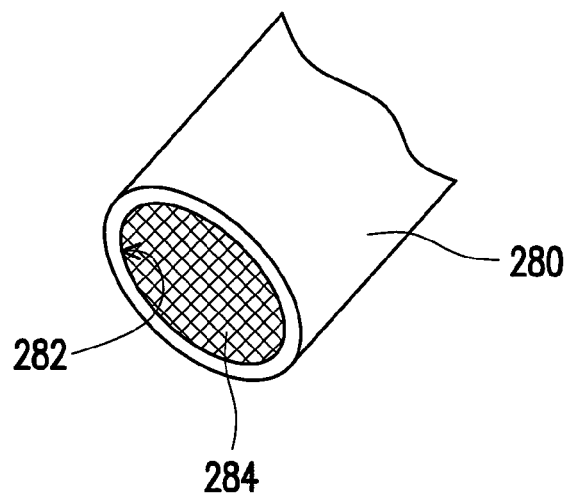
FIG. 7 is a partial three-dimensional diagram of the second guiding-pipe of FIG. 5.

FIG. 6 is a partial cross-sectional diagram of the exhaust structure of the water tank of FIG. 5. Referring to FIG. 6, the water tank 270 of the embodiment has a breathable water-proofing membrane 274 at the exhaust 272 so as to block the liquid reactant 80 and the liquid reactant 80 remains in the water tank 270, while the hydrogen 90 could pass through. FIG. 7 is a partial three-dimensional diagram of the second guiding-pipe of FIG. 5. Referring to FIG. 7, the outlet 282 of the second guiding-pipe 280 in the embodiment has a web component 284 and the hydrogen 90 (shown in FIG. 5) passes through the web component 284 and arrives in the water tank 270. When the hydrogen 90 passes through the web component 284, the hydrogen 90 is divided into many small bubbles to increase the contact area of the hydrogen 90 with the liquid reactant 80. In this way, the liquid reactant 80 could effectively cool the hydrogen 90 down and effectively absorb the handful impurity in the hydrogen 90.

Figure 8:
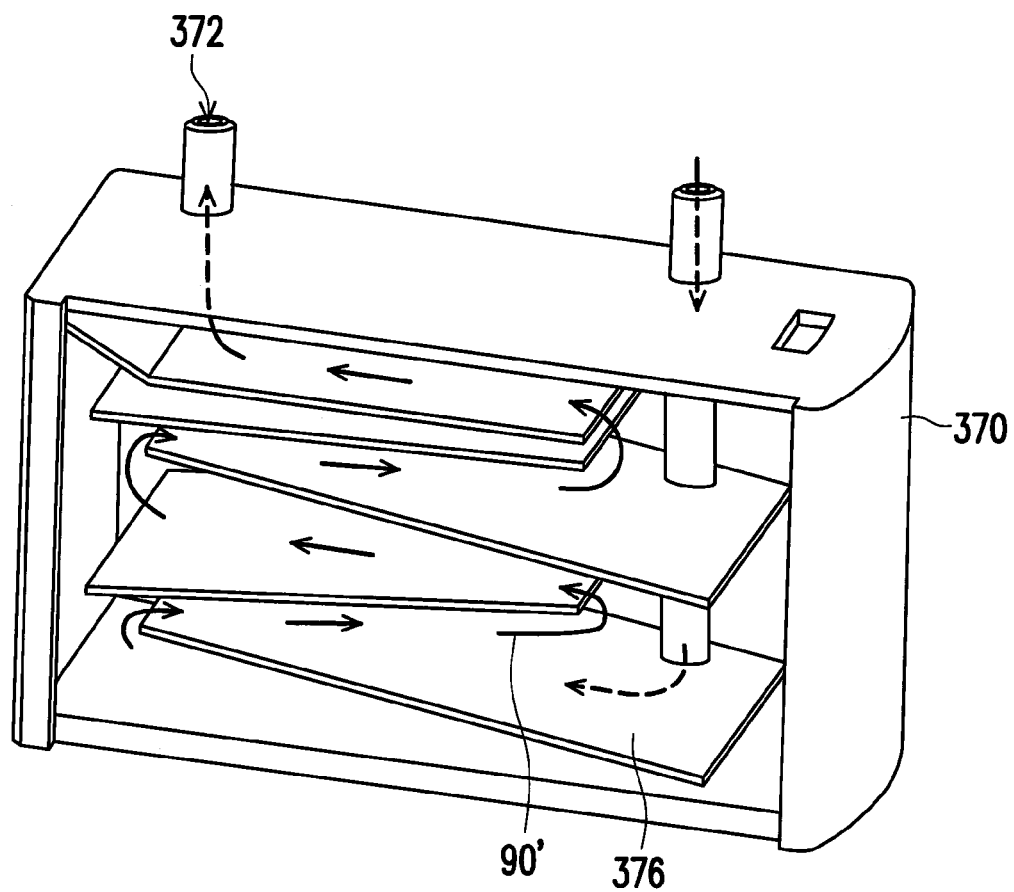
FIG. 8 is a partial three-dimensional diagram of a water tank according to another embodiment of the invention.

FIG. 8 is a partial three-dimensional diagram of a water tank according to another embodiment of the invention. Referring to FIG. 8, in the embodiment, a plurality of partition-boards 376 are disposed in the water tank 370 and the partition-boards 376 form a tortuous channel. At the time, the hydrogen 90' guided to the water tank 370 could arrive at the exhaust 372 through the tortuous channel, which increases the contact time between the hydrogen 90' and the liquid reactant in the water tank 370 so that the liquid reactant could effectively cool the hydrogen 90' down and effectively absorb the handful impurity in the hydrogen 90'.

In summary, in at least one of the above-mentioned embodiments of the invention, since the first guiding-pipe is surrounded by the first open-holes of the first cap, the hydrogen generated by the reaction between the liquid reactant and the solid reactant would flow from the place where the guiding-pipe is located to the first open-holes, which guides the liquid reactant to all the portions of the solid reactant so that the reaction of the solid reactant is more complete to enhance the hydrogen-generating efficiency.

The foregoing description of the preferred embodiments of the invention has been presented for purposes of illustration and description. It is not intended to be exhaustive or to limit the invention to the precise form or to exemplary embodiments disclosed.

Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like does not necessarily limit the claim scope to a specific embodiment, and the reference to particularly preferred exemplary embodiments of the invention does not imply a limitation on the invention, and no such limitation is to be inferred. The invention is limited only by the spirit and scope of the appended claims. Moreover, these claims may refer to use "first", "second", etc. following with noun or element. Such terms should be understood as a nomenclature and should not be construed as giving the limitation on the number of the elements modified by such nomenclature unless specific number has been given. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the present invention as defined by the following claims. Moreover, no element and component in the present disclosure is intended to be dedicated to the public regardless of whether the element or component is explicitly recited in the following claims.

What is claimed is:

1. A hydrogen-generating device, comprising:
   a reaction tank, having an accommodation space for accommodating a solid reactant;
   a first cap, covering the accommodation space, wherein the first cap has a plurality of first open-holes;
   a second cap, disposed on the first cap and having a second open-hole, wherein the first cap and the second cap form a chamber therebetween; and a first guiding-pipe, passing through the first cap and the second cap to extend to the accommodation space, wherein the first open-holes surround the first guiding-pipe, a liquid reactant is capable of passing through the first guiding-pipe to arrive in the accommodation space and reacts with the solid reactant to generate a hydrogen, and the hydrogen passes through the first open-holes to arrive at the chamber and is expelled from the second open-hole.

2. The hydrogen-generating device as claimed in claim 1, wherein the first cap has a plurality of baffles and the baffles extend to the chamber.

3. The hydrogen-generating device as claimed in claim 2, wherein the first open-holes surround the baffles.

4. The hydrogen-generating device as claimed in claim 2, wherein the baffles are a plurality of concentric-circle structures and surround the second open-hole.

5. The hydrogen-generating device as claimed in claim 2, wherein each of the baffles has a plurality of notches and the hydrogen passes through the notches to cross each of the baffles.

6. The hydrogen-generating device as claimed in claim 1, further comprising a filter component, wherein the filter component is disposed in the chamber and the hydrogen passes through the filter component to arrive at the second open-hole.

7. The hydrogen-generating device as claimed in claim 1, wherein the first guiding-pipe passes through the second cap via the second open-hole.

8. The hydrogen-generating device as claimed in claim 1, wherein the second cap further has a third open-hole and the first guiding-pipe passes through the second cap via the third open-hole.

9. The hydrogen-generating device as claimed in claim 1, further comprising a hollow pipe fixed at the reaction tank and located in the accommodation space, wherein the first guiding-pipe extends to the hollow pipe, a wall of the hollow pipe has a plurality of holes, the holes respectively face different areas of the accommodation space and the liquid reactant passes through the holes to arrive in the accommodation space.

10. The hydrogen-generating device as claimed in claim 1, further comprising a water tank for accommodating the liquid reactant, wherein the first guiding-pipe is communicated with the water tank and the liquid reactant is guided from the water tank to the reaction tank through the first guiding-pipe.

11. The hydrogen-generating device as claimed in claim 10, further comprising a second guiding-pipe communicated with the second open-hole and extending to the water tank, wherein the hydrogen passes through the second guiding-pipe and arrives in the water tank from the reaction tank, and the liquid reactant in the water tank is used to cool the hydrogen down.

12. The hydrogen-generating device as claimed in claim 11, wherein an outlet of the second guiding-pipe has a web component and the hydrogen passes through the web component to arrive in the water tank.

13. The hydrogen-generating device as claimed in claim 11, wherein a moisture passes through the second guiding-pipe to arrive in the water tank from the chamber and is solved in the liquid reactant.

14. The hydrogen-generating device as claimed in claim 11, wherein the water tank has an exhaust, and the hydrogen in the water tank passes through the exhaust to be guided to a fuel cell stack.

15. The hydrogen-generating device as claimed in claim 14, wherein the water tank has a plurality of partition-boards to form a tortuous channel, and the hydrogen passes through the tortuous channel to arrive at the exhaust.

16. The hydrogen-generating device as claimed in claim 14, wherein the water tank has a breathable waterproofing membrane at the exhaust.

* * * * *

UNITED STATES PATENT AND TRADEMARK OFFICE
CERTIFICATE OF CORRECTION

PATENT NO. : 9,061,908 B2  
APPLICATION NO. : 13/666992  
DATED : June 23, 2015  
INVENTOR(S) : Po-Kuei Chou et al.

Page 1 of 1

It is certified that error appears in the above-identified patent and that said Letters Patent is hereby corrected as shown below:

On the Title page of the patent grant, the item (71) Applicants information

"Po-Kuei Chou; Yu-Hsiang Lin; Din-Sun Ju; Sin-Yi Gao" should be changed to

-- Po-Kuei Chou; Chien-Hsun Yang; Yu-Hsiang Lin; Din-Sun Ju; Sin-Yi Gao --.

Signed and Sealed this  
Third Day of November, 2015

Michelle K. Lee  
*Director of the United States Patent and Trademark Office*